United States Patent [19]

Pearson

[11] Patent Number: 4,579,839

[45] Date of Patent: Apr. 1, 1986

[54] REHYDRATION BONDABLE ALUMINA

[75] Inventor: Alan Pearson, Murrysville, Pa.

[73] Assignee: Aluminum Company of America, Pittsburgh, Pa.

[21] Appl. No.: 582,934

[22] Filed: Feb. 23, 1984

Related U.S. Application Data

[63] Continuation-in-part of Ser. No. 553,101, Nov. 18, 1983.

[51] Int. Cl.⁴ .............................................. B01J 21/04
[52] U.S. Cl. ................................... 502/439; 423/628; 502/355
[58] Field of Search ........................... 502/8, 439, 355; 423/628; 264/15

[56] References Cited

U.S. PATENT DOCUMENTS

| | | | |
|---|---|---|---|
| 3,222,129 | 12/1965 | Osment et al. | 423/628 |
| 3,856,708 | 12/1974 | Carithers | 252/463 |
| 4,411,771 | 10/1983 | Bambrick et al. | 502/8 X |
| 4,444,899 | 4/1984 | Yamada et al. | 502/439 X |

Primary Examiner—W. J. Shine
Attorney, Agent, or Firm—Daniel A. Sullivan, Jr.

[57] ABSTRACT (1) Rehydration bondable alumina of median particle size less than 5 microns, LOI (250° to 1100° C.) about 4 to 12% by weight, and having the ability to yield rehydration bonded objects of lower density and higher strength as compared with objects made of seven micron rehydration bondable alumina, or density less than 0.9 cm³/g at strength about equal to or greater than 7 MPa; (2) rehydration bondable alumina having the ability to yield rehydration bonded objects having at least 0.6 cc of pore volume per gram for pores smaller than 300 Angstroms. Also encompassed are materials containing such alumina and originating from e.g. bauxite.

15 Claims, 3 Drawing Figures

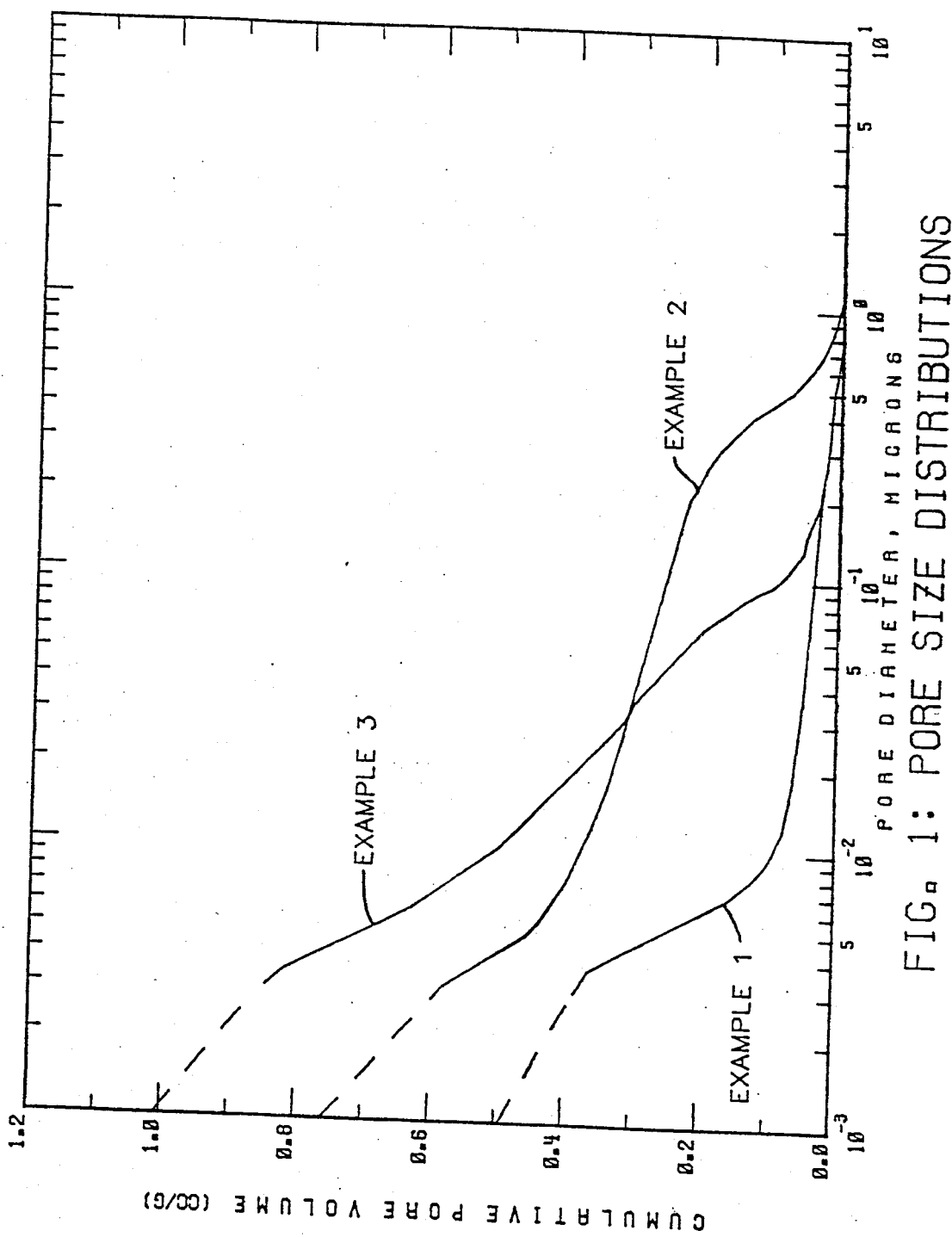
FIG. 1: PORE SIZE DISTRIBUTIONS

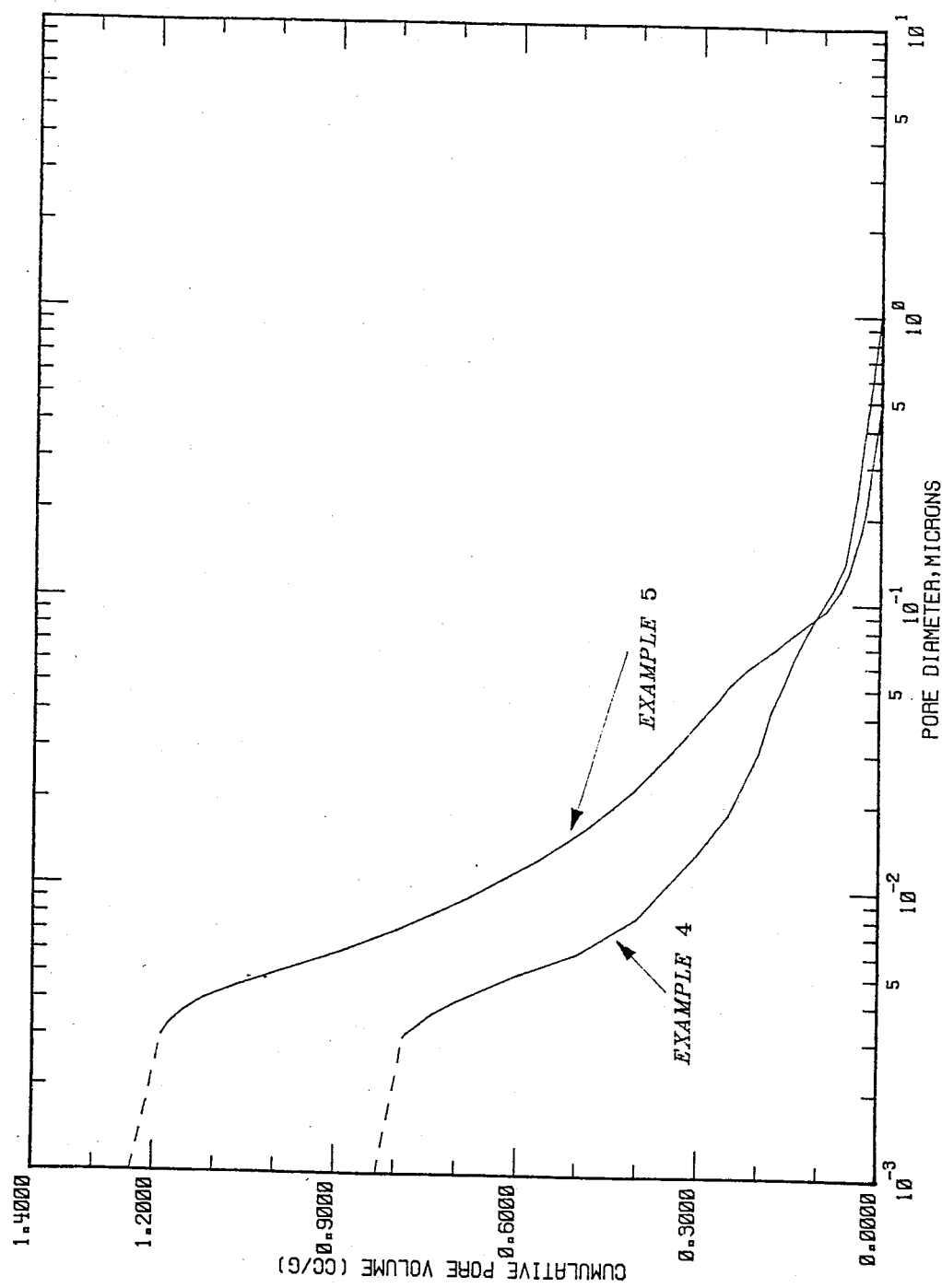
FIG. 2: PORE SIZE DISTRIBUTIONS

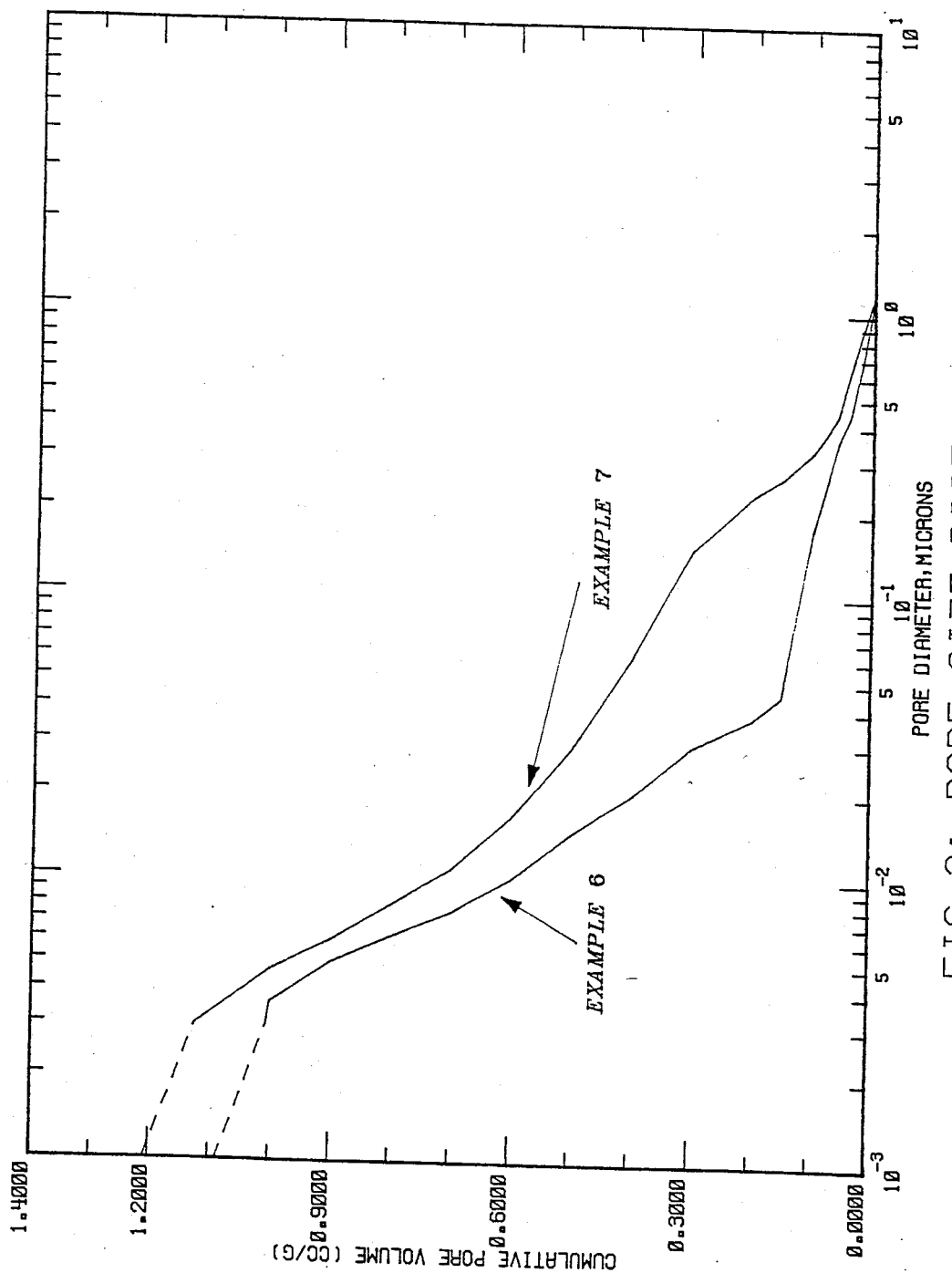

1

REHYDRATION BONDABLE ALUMINA

CROSS-REFERENCE TO RELATED APPLICATION

This is a continuation-in-part of U.S. patent application Ser. No. 553,101, filed November 18, 1983, in the name of Alan Pearson.

BACKGROUND OF THE INVENTION

Low density alumina balls are very useful as a catalyst or catalyst support material, for example, in the automotive catalyst application described in U.S. Pat. No. 4,051,072. For this reason, extensive work has been done to find ways to make such a product, and numerous patents have been issued. In general, two basic methods have been used to obtain low density: "burn outs" and "oil drop".

In the "burn out" approach, either activated alumina, gelatinous alumina, or microcrystalline precipitated boehmite (pseudoboehmite) is mixed with a volatile material and shaped as by pelletizing or extrusion. After aging and drying, the material is heated, causing the volatile component to vaporize or burn out, leaving a porous, low density structure. U.S. Pat. Nos. 3,856,708, 4,051,072, and 4,119,474 are examples of this approach. This method has several drawbacks, since clean burning, controlled-size additives are expensive, while the cheaper additives such as sawdust require high temperatures to burn out, tend to carbonize, and can leave undesirable ash residues. Also, these additives require precautions to prevent dust explosions during use, and in some cases to treat off-gases to prevent environmental pollution.

In the oil-drop method, soluble aluminum compounds, such as aluminum hydroxychloride, are dissolved in water and the solution dropped into an immiscible liquid where the solution is neutralized in some manner, causing the alumina to precipitate, which in turn transforms the drops into rigid spheres. Alternately, expensive microcrystalline boehmite (pseudoboehmite) is dispersed as a colloidal sol, and the sol is dropped into the immiscible fluid, causing the sol to gel either by thermal or chemical means. A number of variations of this approach are represented by U.S. Pat. Nos. 2,620,314; 3,346,336; 3,919,403; 4,116,882; 4,216,122; 4,273,735; 4,279,779; 4,301,033; 4,315,839; and 4,318,896. This method has the disadvantages of expensive raw materials, as well as chemical by-products such as ammonia, chlorides, nitrates, etc., which must be handled and eventually disposed of in some way.

In addition to low density, it is also desirable in certain applications to have a porous alumina object containing a large amount of very fine pores with diameters below about 300 Å. See U.S. Pat. No. 4,001,144.

SUMMARY OF THE INVENTION

It is an object of the invention to provide a new alumina product.

This as well as other objects which will become apparent in the discussion that follows are achieved, according to the present invention, by providing: (1) rehydration bondable alumina of median particle size less than about 5 microns, LOI (250° to 1100° C.) 4 to 12% by weight, and having the ability to yield rehydration bonded objects of lower density and higher strength as compared with objects made of seven micron rehydration bondable alumina, or density less than 0.9 cm$^3$/g at strength about equal to or greater than 7 MPa; (2) rehydration bondable alumina having the ability to yield rehydration bonded objects having at least 0.6 cc of pore volume per gram for pores smaller than 300 Angstroms. Also encompassed are materials containing such alumina and originating from e.g. bauxite. In other variants of the invention, the alumina of (1) above is less than about 4, 3, 2, or even 1 micron. In additional variants of the invention, the alumina of (2) above has the ability to achieve at least 0.7, and even at least 0.8, cc of pore volume per gram of pores smaller than 300 Angstroms.

BRIEF DESCRIPTION OF THE DRAWINGS

FIGS. 1 through 3 show pore size distributions of the products of the examples: "cumulative" signifies that, for a given point on a size distribution curve, the ordinate is the total volume of pores having sizes greater than the corresponding abscissa.

DESCRIPTION OF THE PREFERRED EMBODIMENTS

A. Introduction

I have found that low density alumina spheres can be formed by simply mixing rehydratable alumina powder with water to form a fluid slurry and mixing with a hot, immiscible fluid in such a way that the slurry is dispersed into droplets which become spherical due to surface tension effects, and then solidify by rehydration bonding. This approach avoids the problems associated with burn outs and requires no additional chemical additives. Once solidified, the spheres can be further aged to complete the rehydration reaction, then dried and activated or calcined to develop the desired final properties.

In addition, I have found that alumina shapes with a surprisingly high volume of pores with diameters less than 300 Å can be obtained by using very fine powder as starting material.

B. Rehydration Bondable Alumina Particles

In order to achieve initial activation, hydrated alumina, i.e. Al(OH)$_3$, is rapidly heated to create a porous, poorly crystallized, reactive alumina structure. This step is, per se, well known in the art, and discussed in e.g. U.S. Pat. Nos. 2,915,365 and 3,222,129. A preferred method of initial activation is described in U.S. Pat. No. 4,051,072, column 3, line 46, to column 4, line 7, which portion is incorporated here by reference. Preferred activation conditions are inlet air temperature of 700° to 870° C., outlet temperature of 350° to 500° C. and a powder residence time of less than 3 seconds. This "partially calcined" or "activated" powder typically has a residual water content of about 4 to 12%, as measured by weight loss on heating from 250° to 1100° C. A significant property of the powder for this invention is that it must partially rehydration bond rapidly enough to bond the individual powder particles of a droplet together in a reasonable time during the forming step.

Suitable activated powder is commercially available, examples being Alcoa Activated Alumina Powders CP-7 and CP-1 of Aluminum Company of America. The CP Powders are rehydratable and form a hydroxyl bond upon contact with water. The rehydration reaction is exothermic. Typical physical properties for these CP powders and two experimental powders appear in Table I. The median particle sizes are the "50%<" entries. The CP-7 data are for comparison with the products of the invention, CP-1, CC744-1 and CC786-1.

centrifugally dispersing by dropping onto a rotating plate, mechanically mixing, etc.

In general, the immiscible liquid may be any of those used in the patents listed above in the Background of

TABLE I

| | Alcoa Activated Alumina Powders | | | |
|---|---|---|---|---|
| | Commercial | | Experimental | |
| | CP-7 | CP-1 | CC744-1 | CC786-1 |
| Typical Physical Properties | | | | |
| XRD Analysis, major | amorphous | amorphous | — | — |
| Size**, 90% <, microns | 20.0 | 1.2 | 6.5 | 1.2 |
| 50% <, microns | 7.5 | 1.0 | 2.6 | 0.8 |
| 10% <, microns | 1.3 | 0.8 | 0.8 | 0.5 |
| LBD, lbs/ft$^3$ (approx.) | 34 | 18 | — | — |
| PBD, lbs/ft$^3$ (approx.) | 43 | 26 | — | — |
| SA, m$^2$/g | 325* | 375* | 365* | 350* |
| *on rehydration/activation as in Example I below | | | | |
| Typical Chemical Properties - wt % | | | | |
| Al$_2$O$_3$ | 93.1 | 92.8 | 93.1 | 92.7 |
| SiO$_2$ | 0.02 | 0.06 | 0.02 | 0.06 |
| Fe$_2$O$_3$ | 0.02 | 0.03 | 0.02 | 0.03 |
| Na$_2$O (Total) | 0.35 | 0.45 | 0.35 | 0.50 |
| Na$_2$O Water Soluble (%) | 30 | 40 | 30 | 45 |
| LOI (250–1200° C.) (%) | 6.5 | 6.5 | 5.9 | 6.0 |

XRD = X-ray diffraction
LBD = Loose bulk density
PBD = Packed bulk density
SA = Surface area
LOI = Loss on ignition
— = not measured
*Size in terms of particle diameter as determined by a micromeritics sedigraph.

C. Forming

The activated powder is mixed with water to yield a fluid slurry.

The amount of water used is dependent upon the powder characteristics and desired final properties of the spheres. For a given powder, as water to powder weight ratio decreases, the sphere density will increase and strength will increase. Also, time required for rehydration bonding decreases with decreasing water content. For this reason, if maximum strength is desired, the water content should be close to the minimum amount required to give a pourable consistency (i.e. fluid enough that the drops can contract to a spherical shape due to surface tension effects on contact with the immiscible fluid). If lower density is desired and some loss of strength can be tolerated in the final application, then water content can be increased within limits. In addition, each powder requires a characteristic minimum amount of water to reach a pourable consistency and this minimum amount tends to increase as powder particle size decreases. Also, as powder particle size decreases, the strength of the final product tends to be greater at a given density level. On the other hand, powders generally become more expensive as particle size decreases. Because of these factors, the choice of powder particle size and water content is a complex balance which depends upon desired product properties and cost. For the powders described in the examples, CP-7 requires about 63 to 90 mass-% water (dry powder basis) while CP-1 requires about 83 to 125 mass-% water.

The slurry is mechanically dispersed in a hot liquid which is essentially immiscible with water and which causes the dispersed slurry droplets to assume a more or less spherical shape. The dispersion can be accomplished either before or after the slurry is added to the immiscible fluid. Suitable methods of dispersion include dripping through an orifice plate, streaming, spraying, the Invention with respect to the oil-drop method. Typical property ranges for suitable hydrocarbon or silicone oils are:

| Temp. [°C./°F.] | Viscosity [Centistokes] | Specific Gravity |
|---|---|---|
| 24/75 | 10–2000 | 0.8–0.9 |
| 40/104 | 3–400 | — |
| 80/175 | 0.5–100 | — |

For forming nominally 3 mm diameter spheres in a 2-meter column of oil, properties of a hydrocarbon oil suitable as the immiscible liquid are:

| Temp. [°C./°F.] | Viscosity [Centistokes] | Specific Gravity |
|---|---|---|
| 24/75 | 151 | 0.875 |
| 40/104 | 73 | 0.860 |
| 80/175 | 14.0 | 0.844 |

Oils of other viscosity can be chosen on the basis of Stokes' Law and desired settling time in the column being used. An upward flow of oil in a column may also be used to obtain further control of suspension time in the oil.

After the droplets have been formed into spherical shapes by surface tension effects in the immiscible liquid, the alumina partially rehydrates, forming microcrystalline boehmite which bonds the alumina particles together, converting the slurry droplets into rigid spheres. The rehydration reaction is accelerated by heat and the hot immiscible liquid is conveniently used as a heat source. For atmospheric pressure operation, the oil temperature should be less than about 95° C. to prevent boiling of the water within the droplets but greater than about 50° C. to promote rehydration hardening within a reasonable time. If a pressurized column is used, temperatures above 95° C. can be used as long as boiling of the water is prevented. Important functions of the forming step are to disperse the slurry into spherical droplets and to solidify the droplets to the extent that they retain their shape during subsequent operations.

D. Aging

The rigid spheres from the forming step are further aged in contact with liquid water or water vapor to further the rehydration reaction and develop maximum strength. A typical aged product will contain about 20-60 mass-% boehmite and 0-30 mass-% bayerite. This process step has, per se, been extensively studied as evidenced by U.S. Pat. Nos. 2,881,051; 3,222,129; 3,392,125; 3,480,389; 3,628,914; 3,928,236; 4,001,144; and 4,119,474. A wide variety of aging conditions can be applied to alter chemical purity and pore size distribution for specific applications, but the pellet density, which is established in the forming step, will be essentially unchanged.

E. Final Activation/Calcination

In most cases, the aged material will be given a final heat treatment to decompose products of rehydration (bayerite and boehmite) and establish the desired surface area and phase composition. An example of this is shown in U.S. Pat. No. 4,051,072. Amorphous material, material containing transitional alumina phases such as chi, rho, gamma, or delta, or even alpha phase material, can be obtained by appropriate heating, as is known. Regardless of the heat treatment employed, the low pellet density established in the forming step will be reflected in the finished product.

F. Examples

The following examples illustrate the process.

EXAMPLE 1

This is a comparative example (Reference No. S-100) and uses the prior art method of ball forming (nodulizing) by tumbling in a rotating disc or drum. Hydrated alumina from the Bayer process was ground to a median particle diameter of 7 µm, rapidly activated to produce a product available as Alcoa Activated Alumina Powder CP-7 and then nodulized by adding it to a rotating drum while being sprayed with water for rehydration. After forming, the balls were aged by immersion in water for 4 hours at 60° C. The balls were then dried and given a final activation by heating to 400° C. to decompose rehydration products as described above. Pore size distribution in the final product was as presented in FIG. 1, as determined using an AUTOPORE 9200 instrument manufactured by Micromeritics Instrument Corp. of Norcross, Ga. Other properties of the final product are shown in Table II. It can be seen that this material has a packed bulk density (PBD) of 0.75 g/cm$^3$, which is typical for this type of process. Loose bulk density is about 70-80% of PBD. Particle density was 1.24 g/cm$^3$ and total porosity was 0.49 cm$^3$/g with 0.43 cm$^3$/g pore volume less than 300 Å diameter.

EXAMPLE 2

This example (Reference No. CC-463) shows the improvement using the process of the invention. The same activated powder as in Example 1 was mixed with water (64 g water per 100 g activated powder) to form a pourable slurry. This slurry at room temperature was added drop-wise to a 2-meter column of the hydrocarbon oil mentioned above, heated to 80° C. and having at that temperature a viscosity of 14.0 centistokes and a specific gravity of 0.844. The 3 mm diameter drops reached the bottom of the column within about 20 seconds, by which time they had hardened sufficiently to retain their spherical shapes. After 2 hours, the pellets were removed from the oil and aged an additional 30 minutes in water at 80° C. The pellets were then dried and given a final activation as in Example 1 to give an amorphous final product. The data in Table II show that an over 50% increase in total pore volume was achieved compared to the process of Example 1. This corresponds to a 35% reduction of packed bulk density. Volume of pores with diameter less than 300 Å was 0.45 cc/g. Pore size distribution was determined as in Example 1 and is shown in FIG. 1.

EXAMPLE 3

This example (Reference No. CC-464) shows how properties of material produced by the new method can be varied by changing the particle size of the starting powder. Hydral 710 Al(OH)$_3$, a commercially available precipitated Al(OH)$_3$ (gibbsite) of Aluminum Company of America having a median diameter of 1 µm was activated as described previously to produce a product of the invention available as Alcoa Activated Alumina Powder CP-1 and slurried with water. In this case, 85 g of water were required per 100 g of powder to make a fluid slurry because of the smaller particle size. The slurry was dripped into the oil column, aged, and finally activated as in Example 2 to give an amorphous final product. The data in Table II show that total pore volume was increased by 107% over that of Example 1, and packed bulk density was decreased by 45%. In addition, strength was significantly increased despite the reduction in density, which is contrary to normal expectations. A further unexpected benefit of using finer powder was that micropore volume, i.e. volume of pores of size less than 300 Å, was increased to 0.69 cc/g. Pore size distribution was determined as in Example 1 and is presented in FIG. 1.

TABLE II

| | Example Data | | | | | | |
|---|---|---|---|---|---|---|---|
| | Example No. | | | | | | |
| | 1 | 2 | 3 | 4 | 5 | 6 | 7 |
| Feed Powder Crystal Size (µm) | 7 | 7 | 1 | 2.6 | 0.8 | 1 | 1 |
| Final Activated Ball Properties | | | | | | | |
| Diameter (mm) | 6.3 | 3.3 | 3.2 | — | — | — | — |
| BET Surface Area (m$^2$/g) | 325 | 380 | 328 | 365 | 350 | — | — |
| Packed Bulk Density (g/cm$^3$) | 0.75 | 0.49 | 0.41 | — | — | — | — |
| Helium (true) Density (g/cm$^3$) | 3.15 | 3.19 | 3.16 | 3.15 | 3.15 | 3.15 | 3.15 |
| Mercury (particle) Density (g/cm$^3$) | 1.24 | 0.93 | 0.75 | 0.87 | 0.66 | 0.71 | 0.65 |
| Total Pore Volume* (cm$^3$/g) | 0.49 | 0.76 | 1.01 | 0.83 | 1.20 | 1.09 | 1.22 |
| Micro Pore Volume (cm$^3$/g)** | 0.43 | 0.45 | 0.69 | 0.63 | 0.86 | 0.81 | 0.71 |

TABLE II-continued

Example Data

| | Example No. | | | | | | |
|---|---|---|---|---|---|---|---|
| | 1 | 2 | 3 | 4 | 5 | 6 | 7 |
| Crushing Strength* (MPa) | 7 | 5.6 | 11.8 | — | — | — | 7 |

°Total Pore Volume equals inverse of Hg Density minus inverse of He Density.
*Strength was determined by crushing individual balls using a Chatillon Universal Testing Machine Model UTSE (John Chatillon & Sons Co.) and are based on the ball cross sectional area. Ten-ball averages are shown.
**Pores with diameter less than 300 Angstroms

EXAMPLE 4

This example (Reference No. CC744-1) further demonstrates ability to shift pore size distribution by varying feed particle size. Bayer process hydrated alumina was ground to a median particle size of 2.6 μm and activated as described above. This experimental product was mixed with the minimum water (79 g water per 100 g of powder) and processed as in Example 2. The resulting product had a total pore volume of 0.84 cc/g, an increase of 71% over that of Example 1. Micropore volume was 0.63 cc/g. Pore size distribution is shown in FIG. 2.

EXAMPLE 5

This example (Reference No. CC786-1) demonstrates how pore volume can be further increased by still finer feed material. Hydral 705 Al(OH)$_3$ of Aluminum Company of America, a commercially available precipitated gibbsite, was activated as indicated above, producing a powder with median particle size of 0.8 μm. This experimental product was mixed with water (113 g water per 100 g of powder) and processed as in Example 2. The resulting product had a total pore volume of 1.19 cc/g, an increase of 143% over that of Example 1. Micropore volume was very high at 0.86 cc/g. Pore size distribution is shown in FIG. 2.

The next two examples show how total pore volume can be increased by addition of more water to the composition.

EXAMPLE 6 (Reference No. CC561A)

The test described in Example 3 was repeated except that 89 g water was used per 100 g CP-1 powder. The resulting activated material had a total pore volume of 1.09 cc/g and micropore volume of 0.81 cc/g. Pore size distribution is shown in FIG. 3.

EXAMPLE 7 (Reference No. CC561B)

CP-1 powder was slurried with 113 g water per 100 g of powder and processed as in Example 3. The resulting product had a total pore volume of 1.22 cc/g. This was an increase of 20% over the Example 3 material. Micropore volume was 0.71 cc/g. The increase in porosity was accompanied by a 40% reduction in strength as compared to Example 3. Pore size distribution is shown in FIG. 3.

G. Discussion

FIGS. 1 to 3 show pore size distribution of the rounded objects made using the products of the invention in comparison to the previous product of Examples 1 and 2.

It can be seen from Table II and the Examples that the volume of micropores can be substantially increased by the use of fine rehydratable powders. This is surprising, since the primary particles (median diameter of the finest powder is 0.8 μm or 8000 Å) are orders of magnitude greater than the microporosity.

H. Extensions

Although the Examples show use of gibbsite as the starting material, it should be understood that mixtures of gibbsite and other materials can be used to make the product of the invention as long as sufficient gibbsite is used to provide rehydration bondability. For example, bauxite (which typically contains large proportions of naturally occurring gibbsite) can be activated and used in this process as a lower-cost raw material. The use of bauxite in a prior art nodulizing process is disclosed in U.S. Pat. No. 3,011,980. Also, mixtures of unactivated and activated gibbsite can be used to make nodules as in U.S. Pat. No. 2,876,068. Other variations that can be employed while still taking advantage of the improved low density forming process are addition of inorganic additives to promote specific catalytic reactions and incorporation of burn-out materials to further reduce density or provide additional macroporosity.

What is claimed is:

1. Rehydration bondable alumina of median particle size less than 5 microns, LOI (250° to 1100° C.) about 4 to 12% by weight, and having the ability to yield rehydration bonded objects of lower mercury density at about equal or higher crushing strength as compared with objects made of seven micron rehydration bondable alumina.

2. Alumina as claimed in claim 1, wherein the median particle size is less than about 4 microns.

3. Alumina as claimed in claim 1, wherein the median particle size is less than about 3 microns.

4. Alumina as claimed in claim 1, wherein the median particle size is less than about 2 microns.

5. Alumina as claimed in claim 1, wherein the median particle size is less than about 1 micron.

6. Rehydration bondable alumina of median particle size less than 5 microns having the ability to yield rehydration bonded objects having at least 0.6 cc of pore volume per gram for pores smaller than 300 Angstroms.

7. Alumina as claimed in claim 6, having the ability to achieve at least 0.7 cc of pore volume per gram for pores smaller than 300 Angstroms.

8. Alumina as claimed in claim 6, having the ability to achieve at least 0.8 cc of pore volume per gram for pores smaller than 300 Angstroms.

9. Rehydration bondable alumina of median particle size less than 5 microns, LOI (250° to 1100° C.) about 4 to 12% by weight, and having the ability to yield rehydration bonded objects of mercury density less than 0.9 cm$^3$/g at about equal to or higher than 7 MPa crushing strength.

10. A material comprising rehydration bondable alumina of median particle size less than 5 microns, LOI (250° to 1100° C.) about 4 to 12% by weight, and having the ability to yield rehydration bonded objects of lower mercury density at about equal or higher crushing strength as compared with objects made of seven micron rehydration bondable alumina.

11. A material as claimed in claim 10, based on bauxite.

12. A material comprising rehydration bondable alumina of median particle size less than 5 microns having the ability to yield rehydration bonded objects having at least 0.6 cc of pore volume per gram for pores smaller than 300 Angstroms.

13. A material as claimed in claim 12, based on bauxite.

14. A material comprising rehydration bondable alumina of median particle size less than 5 microns, LOI (250° to 1100° C.) about 4 to 12% by weight, and having the ability to yield rehydration bonded objects of mercury density less than 0.9 $cm^3/g$ at about equal to or higher than 7 MPa crushing strength.

15. A material as claimed in claim 14, based on bauxite.

* * * * *

UNITED STATES PATENT AND TRADEMARK OFFICE
CERTIFICATE OF CORRECTION

PATENT NO. : 4,579,839

DATED : April 1, 1986

INVENTOR(S) : Alan Pearson

It is certified that error appears in the above-identified patent and that said Letters Patent is hereby corrected as shown below:

Col. 1, line 65      After "than", delete "about".

Col. 1, line 65      After "1100°C)", insert --about--.

Table I,
Col. 3, line 28      Change "*Size" to --**Size--.

Signed and Sealed this

Twenty-fifth Day of November, 1986

*Attest:*

DONALD J. QUIGG

*Attesting Officer*      *Commissioner of Patents and Trademarks*